Patented May 27, 1952

2,598,652

UNITED STATES PATENT OFFICE 2,598,652

DERIVATIVE OF ESTRADIOL AND PROCESS OF PREPARING IT

Leon Velluz and Georges Muller, Paris, France, assignors to Les Laboratoires Francais de Chimiotherapie, Paris, France, a corporation of France No Drawing. Application May 8, 1950, Serial No. 160,816. In France June 14, 1949

3 Claims. (Cl. 260—397.4)

This invention relates to a new derivative of estradiol and a process for manufacturing the same. The new compound is a hydroxy-methyl-ketone related to estradiol and may be represented by the following structural formula:

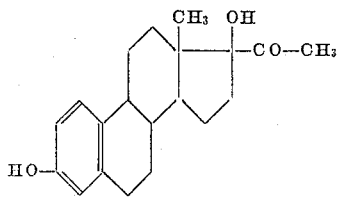

The new substance is a sex hormone useful in human and veterinary medicine.

It has been found that the new compound of the present invention may be obtained from ethinyl-estradiol of the structural formula:

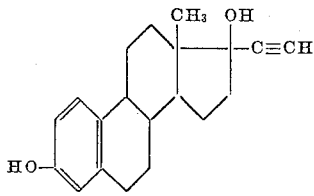

by fixation of a molecule of water, the hydration being effected in the presence of a catalyst, i. e. mercuric salt of para-toluene-sulfamide. Ethinyl-estradiol is a known substance described, for instance, in Ber. Chem. Ges., 1938, 71, 1024 or Naturwissenschaft 1938, 26, 96. Although it should be clearly understood that this invention is not limited to the preferred method of manufacturing the new compound which is the subject of the present invention, this method forms part of the invention and will be described in more detail and illustrated by an example.

The new product may be prepared by maintaining ethinyl-estradiol in alcoholic solution at the boiling point in the presence of mercuric salt of para-toluene-sulfamide. The resultant complex is then decomposed by an acid which allows isolation of the desired steroid. The process involves two steps, the preparation of the catalyst and the hydration proper, as will appear from the following example:

Preparation of the catalyst 2 grams of yellow mercuric oxide and 3.3 grams of para-toluene-sulfamide are ground together, then heated while agitated for 2 hours at 200° C. The gummy solid resulting from this treatment is then melted by heating it to a temperature of 205–210° C. for several minutes. The compact mass obtained by cooling the melted product is ground and treated four times with 20 cc. of boiling alcohol. By draining, 3.3 grams (65%) of catalyst is separated.

Hydration of ethinyl-estradiol 1 gram of ethinyl-estradiol (m. 182° C.) is heated at reflux for seven days with 2 grams of the above-described catalyst in 100 cc. of 95% ethyl alcohol. The reaction product is then cooled, filtered, the catalyst is washed in alcohol and the solvent distilled whereby finally 1.4 grams of residue is obtained. The catalyst is then treated anew with acetic acid whereby 0.5 grams of residue is separated from the reaction product, for a total of 1.9 grams of residue. This residue is then extracted by hot water in order to eliminate any catalyst it may still retain, then treated, while in the boiling water bath, by $\frac{1}{5}$ diluted hydrochloric acid, in the presence of benzene. The catalyst is now completely separated from the steroid which, in turn, is dissolved in the organic solvent, separated, washed in water, dried and distilled. There is obtained about 0.6 gram (55 to 60%) of the new compound of this invention, melting successively at 216° and at 244° C. after recrystallization in benzene. Its optical rotation, measured with the sodium D line in acetone solution, is $+35°$.

| Analysis | $C_{20}$ | $H_{26}$ | $O_3$ |
|---|---|---|---|
| Calculated | C 76.4 | H 8.3 | O 15.3 |
| Found | 76.4 | 8.4 | 15.2 |

What is claimed is:

1. As a new compound, crystalline 3,17-dihydroxy-17-acetyl-$\Delta_{1,3,5}$-estratriene of the formula

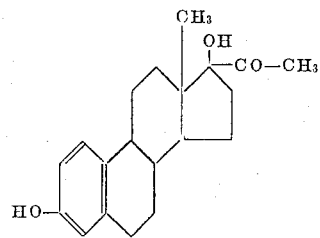

having an optical rotation of $(a)_D: +35°$ in acetone solution.

2. In a process of hydrating ethinyl estradiol to 3,17-dihydroxy-17-acetyl-$\Delta_{1,3,5}$-estratriene, the steps comprising heating, to boiling, an alcoholic solution of ethinyl estradiol in the presence of mercuric salt of p-toluene sulfonamide, until hydration of said ethinyl estradiol is effected, decomposing the resulting complex by acid treatment, and isolating the 3,17-dihydroxy-17-acetyl-$\Delta_{1,3,5}$-estratriene formed.

3. A process for the preparation of 3,17-dihydroxy-17-acetyl - $\Delta_{1,3,5}$ - estratriene comprising the steps of hydrating ethinyl-estradiol in the presence of mercuric salt of para-toluene-sulfamide and separating the compound from the reaction mixture.

LEON VELLUZ.
GEORGES MULLER.

REFERENCES CITED

The following references are of record in the file of this patent:

UNITED STATES PATENTS

| Number | Name | Date |
|---|---|---|
| 2,280,236 | Inhoffen | Apr. 21, 1942 |